(12) United States Patent
Cheng et al.

(10) Patent No.: US 8,670,102 B2
(45) Date of Patent: Mar. 11, 2014

(54) DISPLAY PANEL

(75) Inventors: Mien-Mien Cheng, Kaohsiung (TW);
Yi-Suei Liao, Kaohsiung (TW);
Jian-Hong Lin, Taipei County (TW);
Chien-Feng Chiu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 408 days.

(21) Appl. No.: 13/005,538

(22) Filed: Jan. 13, 2011

(65) Prior Publication Data
US 2012/0050658 A1 Mar. 1, 2012

(30) Foreign Application Priority Data
Aug. 25, 2010 (TW) ................................ 99128491 A (51) Int. Cl.
*G02F 1/1333* (2006.01)

(52) U.S. Cl.
USPC ............................................ 349/158; 349/54

(58) Field of Classification Search
USPC ................................................ 349/40, 54, 192
See application file for complete search history.

(56) References Cited

U.S. PATENT DOCUMENTS

| 6,111,621 | A | 8/2000 | Kim et al. |
| 7,034,905 | B2 | 4/2006 | Sah et al. |
| 7,755,712 | B2 | 7/2010 | Peng et al. |
| 8,077,270 | B2 | 12/2011 | Peng et al. |
| 2004/0070700 | A1 | 4/2004 | Sah et al. |
| 2008/0062347 | A1 | 3/2008 | Peng et al. |
| 2008/0094561 | A1* | 4/2008 | Fan et al. ............... 349/151 |
| 2010/0193222 | A1 | 8/2010 | Peng et al. |

FOREIGN PATENT DOCUMENTS

| CN | 101408681 | 4/2009 |
| CN | 101699551 | 4/2010 |
| TW | I248533 | 2/2006 |
| TW | 200611009 | 4/2006 |
| TW | 200644045 | 12/2006 |
| TW | 200813952 | 3/2008 |

* cited by examiner

*Primary Examiner* — Richard Kim
(74) *Attorney, Agent, or Firm* — Jianq Chyun IP Office (57) ABSTRACT

A display panel includes an active device array substrate, an opposite substrate, and a liquid crystal layer. The active device array substrate includes a substrate and further includes a pixel array, signal lines, and first and second repairing lines all disposed on the substrate. The signal lines electrically connect the pixel array. The first repairing line includes first and second line segments respectively located on first and second sides of the pixel array. The first side is substantially perpendicular to the second side. The first and second line segments are electrically connected. The second repairing line includes third and fourth line segments respectively located on third and second sides of the pixel array. The third side is substantially parallel to the first side. The fourth and third line segments are electrically connected. The opposite substrate above the active device array substrate does not cover the first and third line segments.

20 Claims, 9 Drawing Sheets

DISPLAY PANEL

CROSS-REFERENCE TO RELATED APPLICATION

This application claims the priority benefit of Taiwan application serial no. 99128491, filed on Aug. 25, 2010. The entirety of the above-mentioned patent application is hereby incorporated by reference herein and made a part of this specification.

BACKGROUND OF THE INVENTION

1. Field of the Invention

The invention relates to a panel. More particularly, the invention relates to a display panel.

2. Description of Related Art

In general, a liquid crystal display (LCD) panel is mainly comprised of an active device array substrate, an opposite substrate, and a liquid crystal layer sandwiched between the active device array substrate and the opposite substrate. The active device array substrate has a plurality of pixels arranged in an array, and each of the pixels includes an active device and a pixel electrode electrically connected to the active device. A plurality of scan lines and a plurality of data lines are disposed on the active device array substrate, and the active device in each of the pixels is electrically connected to the corresponding scan line and the corresponding data line.

The great length of scan lines and data lines on the active device array substrate easily results in broken lines. When a scan line or a data line is broken, some of the pixels malfunction, and a line defect occurs. Therefore, the broken line needs to be repaired. In general, to repair the broken line instantly, at least one repairing line is reserved on the active device array substrate. Under normal circumstances, the repairing line is intersected with the signal lines, and the intersecting points are welding points. Besides, the repairing line is electrically insulated from the signal lines. When an open defect occurs in one of the signal lines, i.e., the signal line is broken, two ends of the broken signal line are respectively welded to the repairing line through the welding points, such that the broken signal line remains electrically connected through the repairing line, and the corresponding pixels can function properly.

The opposite substrate is a color filter substrate in most cases and is disposed above the active device array substrate. Besides, the opposite substrate includes a substrate, a light shielding pattern layer, a plurality of color filter patterns, and an electrode layer. The color filter patterns are arranged within the light shielding pattern layer, and the electrode layer covers the light shielding pattern layer and the color filter patterns.

Note that the opposite substrate having the electrode layer often covers the active device array substrate, and thus the electrode layer is located right above the repairing line. Thereby, capacitance is generated between the electrode layer and the repairing line. When the repairing line is connected to the broken signal line through the welding points, a RC overloading effect on the repairing line is likely to occur due to the excessive capacitance generated between the repairing line and the electrode layer. As such, signal transmission on the signal line is negatively affected. Namely, the RC overloading effect caused by the repairing operation results in distorted signals during transmission, thereby affecting the display quality of the display panel.

SUMMARY OF THE INVENTION

The invention is directed to a display panel which can prevent an RC overloading effect on a repairing line, so as to ensure the display quality after repair.

The invention provides a display panel that includes an active device array substrate, an opposite substrate, and a liquid crystal layer. The active device array substrate includes a first substrate, a pixel array, a plurality of signal lines, a first repairing line, and a second repairing line. The pixel array is disposed on the first substrate. The signal lines are disposed on the first substrate and electrically connected to the pixel array. The first repairing line is disposed on the first substrate and includes a first line segment and a second line segment. The first line segment is located at a first side of the pixel array. The second line segment is located at a second side of the pixel array and electrically connected to the first line segment. Here, the first side is substantially perpendicular to the second side. The second repairing line is disposed on the first substrate and includes a third line segment and a fourth line segment. The third line segment is located at a third side of the pixel array, and the third side is substantially parallel to the first side. The fourth line segment is located at the second side of the pixel array and electrically connected to the third line segment. The opposite substrate is located above the active device array substrate and does not cover the first line segment and the third line segment. The opposite substrate includes a second substrate and an electrode layer. The second substrate is located opposite to the first substrate. The electrode layer is disposed on the second substrate. The liquid crystal layer is disposed between the active device array substrate and the opposite substrate.

According to an embodiment of the invention, the display panel further includes a sealant disposed between the active device array substrate and the opposite substrate. The first line segment and the third line segment are located at an outer side of the sealant.

According to an embodiment of the invention, the opposite substrate does not cover the second line segment and the fourth line segment.

According to an embodiment of the invention, the second line segment and the fourth line segment are overlapped with an end of the corresponding signal lines.

According to an embodiment of the invention, the second line segment includes a first trace, a plug, and a second trace. The first trace is electrically connected to the first line segment. The second trace is overlapped with an end of the corresponding signal lines. The first trace and the second trace are electrically connected through the plug.

According to an embodiment of the invention, the fourth line segment includes a third trace, a plug, and a fourth trace. The third trace is electrically connected to the third line segment. The fourth trace is overlapped with an end of the corresponding signal lines. The third trace and the fourth trace are electrically connected through the plug.

According to an embodiment of the invention, the first repairing line further includes a plurality of first sub-line segments and a plurality of second sub-line segments. Each of the first sub-line segments is electrically connected to the second line segment, and each of the second sub-line segments is overlapped with a corresponding one of the first sub-line segments and an end of the corresponding signal lines.

According to an embodiment of the invention, extending directions of the first sub-line segments are substantially perpendicular to an extending direction of the second line segment, and extending directions of the second sub-line segments are substantially parallel to the extending direction of the second line segment.

According to an embodiment of the invention, the second repairing line further includes a plurality of third sub-line segments and a plurality of fourth sub-line segments. Each of the third sub-line segments is electrically connected to the fourth line segment, and each of the fourth sub-line segments is overlapped with a corresponding one of the third sub-line segments and an end of the corresponding signal lines.

According to an embodiment of the invention, extending directions of the third sub-line segments are substantially perpendicular to an extending direction of the fourth line segment, and extending directions of the fourth sub-line segments are substantially parallel to the extending direction of the fourth line segment.

The invention further provides a display panel that includes an active device array substrate, an opposite substrate, and a liquid crystal layer. The active device array substrate includes a first substrate, a pixel array, a plurality of signal lines, a first repairing line, and a second repairing line. The pixel array is disposed on the first substrate. The signal lines are disposed on the first substrate and electrically connected to the pixel array. One of the signal lines has an open defect. The first repairing line is disposed on the first substrate and includes a first line segment and a second line segment. The first line segment is located at a first side of the pixel array. The second line segment is located at a second side of the pixel array. The first side is substantially perpendicular to the second side. The second line segment is electrically connected to the first line segment and overlapped with an end of the corresponding signal lines. The second repairing line is disposed on the first substrate and includes a third line segment and a fourth line segment. The third line segment is located at a third side of the pixel array, and the third side is substantially parallel to the first side. The fourth line segment is located at the second side of the pixel array. The fourth line segment is electrically connected to the third line segment and overlapped with an end of the corresponding signal lines. Here, an overlapping area of the second line segment and the signal line having the open defect has at least one welding point. The opposite substrate is located above the active device array substrate and does not cover the first line segment and the third line segment. The opposite substrate includes a second substrate and an electrode layer. The second substrate is located opposite to the first substrate. The electrode layer is disposed on the second substrate. The liquid crystal layer is disposed between the active device array substrate and the opposite substrate.

According to an embodiment of the invention, the display panel further includes a sealant disposed between the active device array substrate and the opposite substrate. The first line segment and the third line segment are located at an outer side of the sealant.

According to an embodiment of the invention, the opposite substrate does not cover the second line segment and the fourth line segment.

According to an embodiment of the invention, the second line segment includes a first trace, a plug, and a second trace. The first trace is electrically connected to the first line segment. The second trace is overlapped with an end of the corresponding signal lines. The first trace and the second trace are electrically connected through the plug. An overlapping area of the second trace and the signal line having the open defect has at least one welding point.

The invention further provides a display panel that includes an active device array substrate, an opposite substrate, and a liquid crystal layer. The active device array substrate includes a first substrate, a pixel array, a plurality of signal lines, a first repairing line, and a second repairing line. The pixel array is disposed on the first substrate. The signal lines are disposed on the first substrate and electrically connected to the pixel array. One of the signal lines has an open defect. The first repairing line is disposed on the first substrate and includes a first line segment, a second line segment, a plurality of first sub-line segments, and a plurality of second sub-line segments. The first line segment is located at a first side of the pixel array. The second line segment is located at a second side of the pixel array and electrically connected to the first line segment. Here, the first side is substantially perpendicular to the second side. Each of the first sub-line segments is electrically connected to the second line segment, and each of the second sub-line segments is overlapped with a corresponding one of the first sub-line segments and an end of the corresponding signal lines. An overlapping area of one of the second sub-line segments and the signal line having the open defect has a welding point, and an overlapping area of the second sub-line segment and a corresponding one of the first sub-line segments has a welding point. The second repairing line is disposed on the first substrate and includes a third line segment and a fourth line segment. The third line segment is located at a third side of the pixel array, and the third side is substantially parallel to the first side. The fourth line segment is located at the second side of the pixel array and electrically connected to the third line segment. The opposite substrate is located above the active device array substrate and does not cover the first line segment and the third line segment. The opposite substrate includes a second substrate and an electrode layer. The second substrate is located opposite to the first substrate. The electrode layer is disposed on the second substrate. The liquid crystal layer is disposed between the active device array substrate and the opposite substrate.

According to an embodiment of the invention, the display panel further includes a sealant disposed between the active device array substrate and the opposite substrate. The first line segment and the third line segment are located at an outer side of the sealant.

According to an embodiment of the invention, the opposite substrate does not cover the second line segment and the fourth line segment.

According to an embodiment of the invention, extending directions of the first sub-line segments are substantially perpendicular to an extending direction of the second line segment, and extending directions of the second sub-line segments are substantially parallel to the extending direction of the second line segment.

According to an embodiment of the invention, the second repairing line further includes a plurality of third sub-line segments and a plurality of fourth sub-line segments. Each of the third sub-line segments is electrically connected to the fourth line segment, and each of the fourth sub-line segments is overlapped with a corresponding one of the third sub-line segments and an end of the corresponding signal lines.

According to an embodiment of the invention, extending directions of the third sub-line segments are substantially perpendicular to an extending direction of the fourth line segment, and extending directions of the fourth sub-line segments are substantially parallel to the extending direction of the fourth line segment.

Based on the above, the opposite substrate in the display panel of the invention at least does not cover parts of the repairing lines, and therefore at least parts of the repairing lines and the electrode layer of the opposite substrate do not generate the capacitance. Thus, when the repairing lines are connected to the signal lines for repairing the signal lines, the RC overloading effect on the repairing lines does not occur, and the signal transmission on the signal lines is not affected. As such, satisfactory display quality of the display panel can be achieved after repair.

In order to make the aforementioned and other features and advantages of the disclosure comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
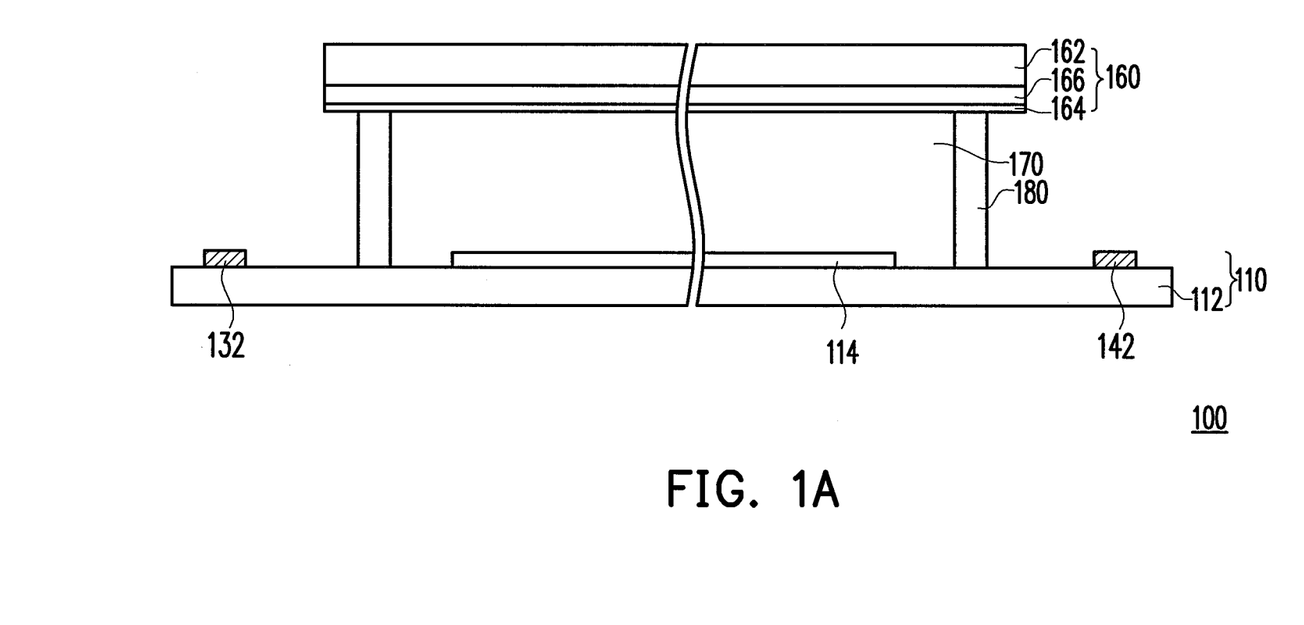
FIG. 1A is a schematic cross-sectional view illustrating a display panel according to a first embodiment of the invention.
Figure 1B:
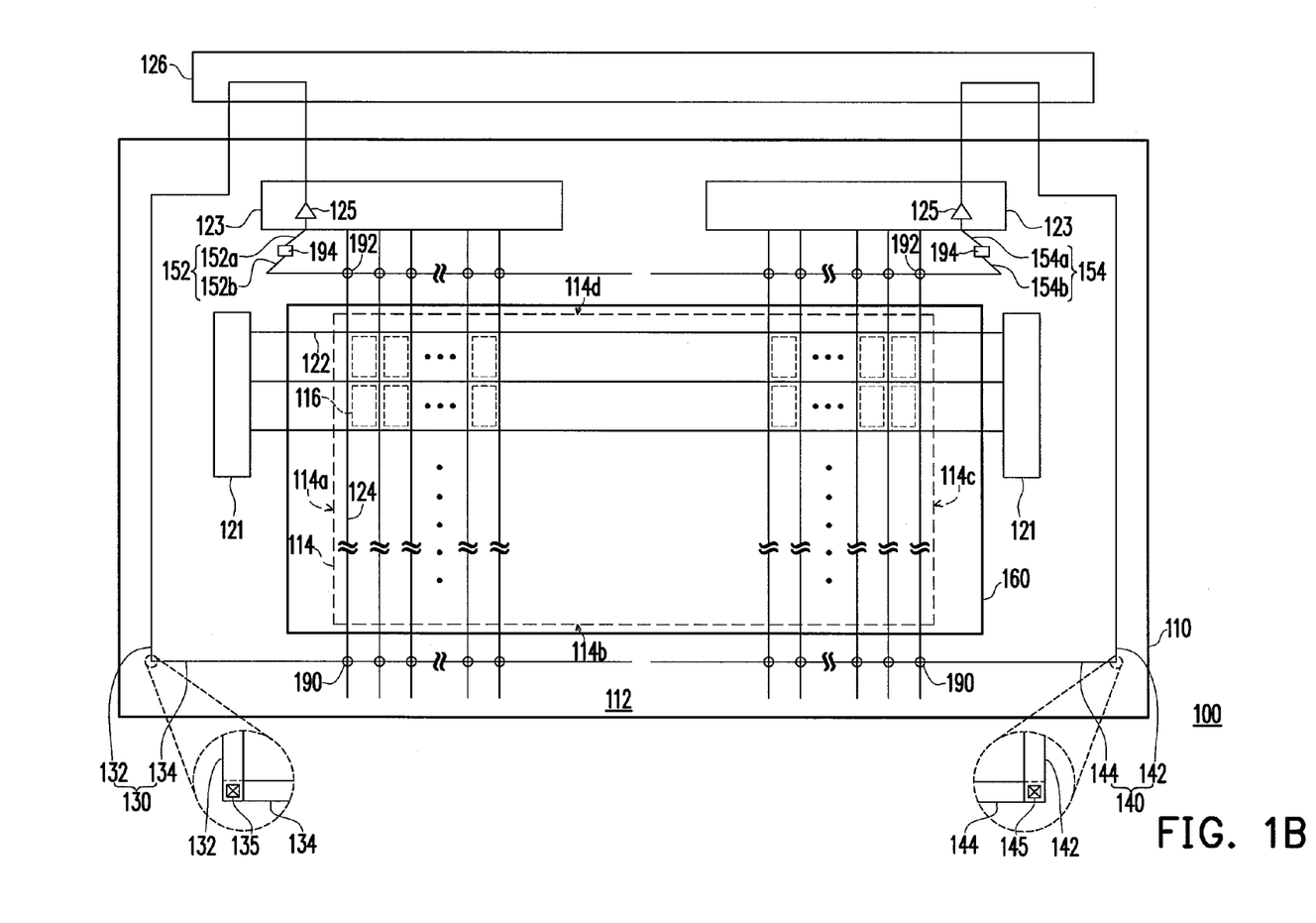
FIG. 1B is a schematic top view illustrating the display panel depicted in FIG. 1A.

FIG. 1A is a schematic cross-sectional view illustrating a display panel according to a first embodiment of the invention. FIG. 1B is a schematic top view illustrating the display panel depicted in FIG. 1A. In FIG. 1B, the liquid crystal layer is not shown. With reference to FIG. 1A and FIG. 1B, a display panel 100 of this embodiment includes an active device array substrate 110, an opposite substrate 160, and a liquid crystal layer 170. The active device array substrate 110 includes a first substrate 112, a pixel array 114, a plurality of scan lines 122, a plurality of data lines 124, a first repairing line 130, and a second repairing line 140. The pixel array 114 is disposed on the first substrate 112. The pixel array 114 includes a plurality of pixels 116 arranged in array, and the pixels 116 include active devices (not shown) of thin film transistors and pixel electrodes (not shown) electrically connected to the active devices. The scan lines 122 and the data lines 124 are disposed on the first substrate 112 and electrically connected to the pixel array 114. Specifically, the scan lines 122 and the data lines 124 are disposed on the first substrate 112 and intersected. A gate driving circuit 121 and a source driving circuit 123 are respectively connected to the active devices of the corresponding pixels 116 through the scan lines 122 and the data lines 124, so as to drive the pixel array 114.

The opposite substrate 160 is disposed above the active device array substrate 110. In this embodiment, the opposite substrate 160 is, for instance, a color filter substrate and includes a second substrate 162, an electrode layer 164, and a color filter layer 166. The second substrate 162 is disposed opposite to the first substrate 112. The color filter layer 166 is located on the second substrate 162. The electrode layer 164 is disposed on the second substrate 162 and covers the entire second substrate 162 and the entire color filter layer 166, for instance. The liquid crystal layer 170 is disposed between the active device array substrate 110 and the opposite substrate 160.

The first repairing line 130 is disposed on the first substrate 112 and includes a first line segment 132 and a second line segment 134. The first line segment 132 is located at a first side 114a of the pixel array 114. The second line segment 134 is located at a second side 114b of the pixel array 114 and electrically connected to the first line segment 132. Here, the first side 114a is substantially perpendicular to the second side 114b. In this embodiment, the first side 114a is substantially parallel to extending directions of the data lines 124, and the second side 114b is substantially parallel to extending directions of the scan lines 122, for instance. The second repairing line 140 is disposed on the first substrate 112 and includes a third line segment 142 and a fourth line segment 144. The third line segment 142 is located at a third side 114c of the pixel array 114, and the third side 114c is substantially parallel to the first side 114a. The fourth line segment 144 is electrically connected to the third line segment 142 and located at the second side 114b of the pixel array 114. In this embodiment, the third side 114c is substantially parallel to the extending directions of the data lines 124, and the second side 114b is substantially parallel to the extending directions of the scan lines 122, for instance. That is to say, the first line segment 132 and the third line segment 142 are located at opposite sides of the pixel array 114. The second line segment 134 and the fourth line segment 144 are located at the same side of the pixel array 114 and electrically insulated from each other. The first repairing line 130 and the second repairing line 140 are electrically connected to a circuit board 126, for instance.

In this embodiment, the second line segment 134 of the first repairing line 130 is overlapped with an end of the corresponding data lines 124, and the fourth line segment 144 of the second repairing line 140 is overlapped with an end of the corresponding data lines 124, for instance. Particularly, in this embodiment, an end of the first repairing line 130 is connected to an amplifier 125 in the source driving circuit 123 through the circuit board 126, and the other end of the first repairing line 130, i.e., the second line segment 134, is overlapped with an end of the corresponding data lines 124, so as to form a plurality of pre-repair points 190. Similarly, an end of the second repairing line 140 is connected to the amplifier 125 in the source driving circuit 123 through the circuit board 126, and the other end of the second repairing line 140, i.e., the fourth line segment 144, is overlapped with an end of the corresponding data lines 124, so as to form a plurality of pre-repair points 190.

According to this embodiment, the first line segment 132, the third line segment 142, and the data lines 124 are formed by a second metal layer (Metal 2), and the second line segment 134, the fourth line segment 144, and the scan lines 122 are formed by a first metal layer (Metal 1), for instance. An insulating layer is disposed between the first metal layer and the second metal layer. The first repairing line 130 further includes a plug 135 formed in the insulating layer, so as to electrically connect the first line segment 132 and the second line segment 134. Similarly, the second repairing line 140 further includes a plug 145 formed in the insulating layer, so as to electrically connect the third line segment 142 and the fourth line segment 144.

In this embodiment, the active device array substrate 110 further includes a third repairing line 152 and a fourth repairing line 154. The third repairing line 152 and the fourth repairing line 154 are located at a fourth side 114d of the pixel array 114, for example, and the fourth side 114d and the second side 114b are at opposite sides. In this embodiment, the third repairing line 152 includes a first portion 152a and a second portion 152b. The first portion 152a is connected to the amplifier 125, and the second portion 152b is overlapped with an end of the corresponding data lines 124, so as to form a plurality of pre-repair points 192. Besides, an end of the first portion 152a of the third repairing line 152 covers an end of the adjacent second portion 152b of the third repairing line 152, so as to form a pre-repair point 194. In this embodiment, preferably, the first portion 152a and the second portion 152b of the third repairing line 152 are in different layers and electrically insulated from each other, and one of the first and the second portions 152a and 152b is disposed above the other. The pre-repair point 194 is formed in an overlapping area of the first and the second portions 152a and 152b. Likewise, the fourth repairing line 154 includes a third portion 154a and a fourth portion 154b. The third portion 154a is connected to the amplifier 125, and the fourth portion 154b is overlapped with an end of the corresponding data lines 124, so as to form a plurality of pre-repair points 192. Besides, an end of the third portion 154a of the fourth repairing line 154 covers an end of the adjacent fourth portion 154b of the fourth repairing line 154, so as to form a pre-repair point 194. In this embodiment, preferably, the third portion 154a and the fourth portion 154b of the fourth repairing line 154 are in different layers and electrically insulated from each other, and one of the third and the fourth portions 154a and 154b is disposed above the other. The pre-repair point 194 is formed in an overlapping area of the third and the fourth portions 154a and 154b. According to this embodiment, the first portion 152a of the third repairing line 152 and the third portion 154a of the fourth repairing line 154 are formed by the second metal layer (Metal 2), and the second portion 152b of the third repairing line 152 and the fourth portion 154b of the fourth repairing line 154 are formed by the first metal layer (Metal 1), for instance.

Figure 2:
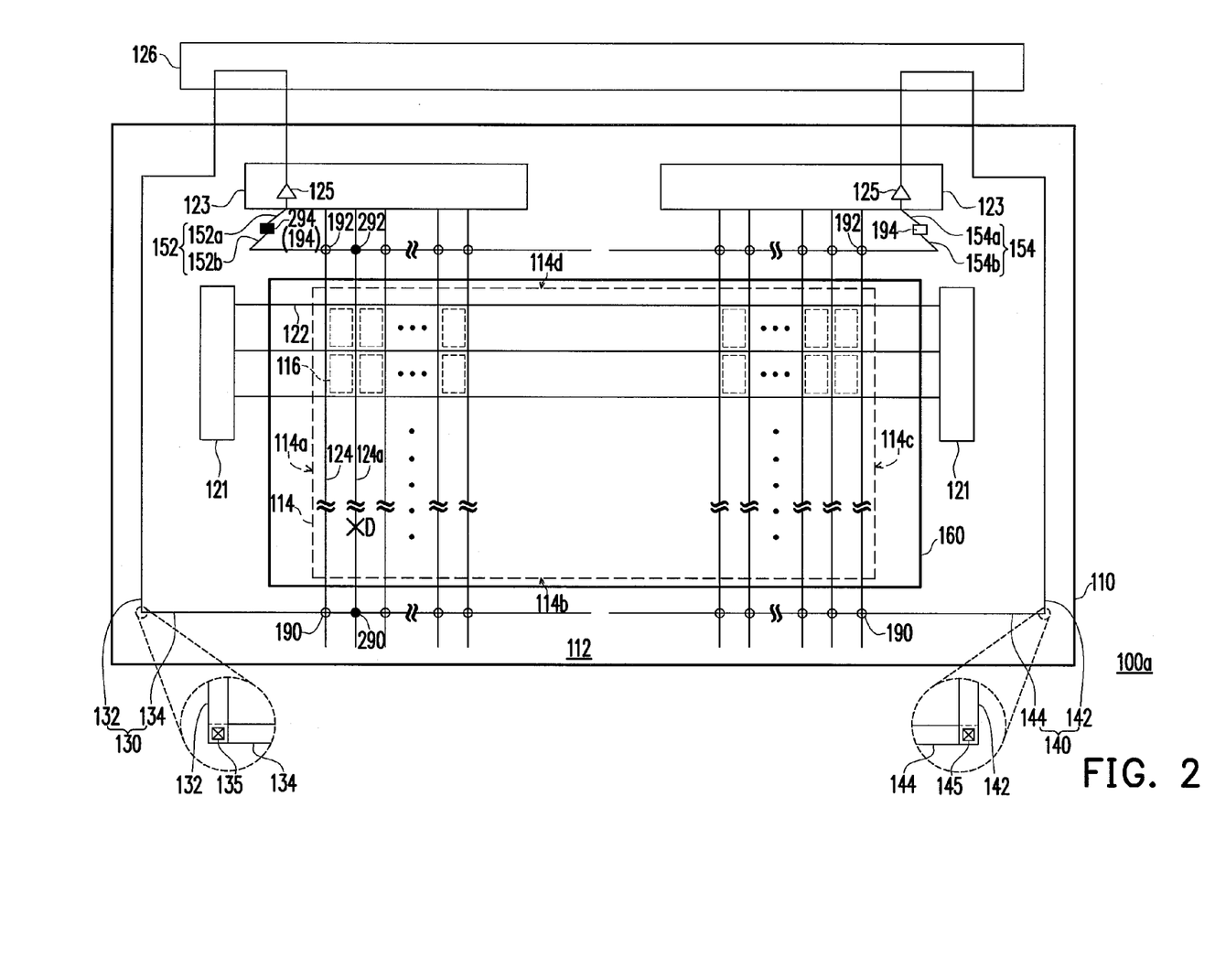
FIG. 2 is a schematic top view illustrating a display panel according to an embodiment of the invention.

One of the data lines 124 in the aforesaid display panel 100 has an open defect and is then repaired, and the structure of the repaired data line 124 is described below. FIG. 2 illustrates a display panel 100a. The display panel 100a is the display panel 100 of FIG. 1B which has the open defect and is repaired. Note that the first repairing line 130 and the third repairing line 152 are used to repair the broken data line 124a that is overlapped with the first and the third repairing lines 130 and 152, as shown in FIG. 2. However, the broken data line 124a overlapped with the second and the fourth repairing lines 140 and 154 is repaired by using the second and the fourth repairing lines 140 and 154 in the same way, and thus no further description is provided hereinafter.

As depicted in FIG. 2, given one data line 124a of the data lines 124 of the signal lines has an open defect D and is broken, the pre-repair points 192, 194, and 190 corresponding to the broken data line 124a are welded, so as to form welding points 292, 294, and 290. Thereby, a complete data transmission circuit can be formed. More specifically, the data line 124a is electrically connected to the second portion 152b of the third repairing line 152 through the welding point 292 (i.e., the welded pre-repair point 192), and the second portion 152b of the third repairing line 152 is electrically connected to the first portion 152a of the third repairing line 152 through the welding point 294 (i.e., the welded pre-repair point 194). In addition, the first portion 152a of the third repairing line 152 is electrically connected to an end of the first repairing line 130 through the amplifier 125, while the other end of the first repairing line 130 is electrically connected to the data line 124a through the welding point 290 (i.e., the welded pre-repair point 190). As such, signals can be transmitted to the pixels corresponding to the data line 124a, and the pixels can be driven to function in a normal manner.

Note that the opposite substrate 160 does not cover the first line segment 132 and the third line segment 142 in the display panels 100 and 100a of this embodiment, as shown in FIG. 1A to FIG. 2. Hence, the electrode layer 164 is not located right above the first line segment 132 and the third line segment 142. As a result, capacitance is not generated between the first line segment 132 and the electrode layer 164 and between the third line segment 142 and the electrode layer 164. Additionally, in this embodiment, the opposite substrate 160 does not cover the second line segment 134 and the fourth line segment 144, for instance. In other words, the opposite substrate 160 of this embodiment does not cover the first repairing line 130 and the second repairing line 140, such that the first and the second repairing lines 130 and 140 are exposed outside the opposite substrate 160. Moreover, in this embodiment, the opposite substrate 160 does not cover the third repairing line 152 and the fourth repairing line 154, such that the third and the fourth repairing lines 152 and 154 are exposed outside the opposite substrate 160. Accordingly, in this embodiment, all of the repairing lines 130, 140, 152, and 154 are exposed outside the opposite substrate 160, for instance. Thereby, capacitance is not generated between the electrode layer 164 of the opposite substrate 160 and the repairing lines 130, 140, 152, and 154. However, the opposite substrate 160 can also cover the third and the fourth repairing lines 152 and 154 in another embodiment. Alternatively, the opposite substrate 160 can cover the second and the fourth line segments 134 and 144, while the first line segment 132 and the third line segment 142 are exposed. The invention is not limited to what is described above.

The display panel 100 shown in FIG. 1A and the display panel 100a both include a sealant 180 disposed between the active device array substrate 110 and the opposite substrate 160, for example. Besides, the sealant 180 surrounds the pixel array 114, which is not shown in FIG. 1B and FIG. 2. In this embodiment, the first line segment 132 and the second line segment 134 of the first repairing line 130 are located at an outer side of the sealant 180, and the third line segment 142 and the fourth line segment 144 of the second repairing line 140 are also located at the outer side of the sealant 180, for instance.

It should be mentioned that the first side 114a is substantially parallel to the extending directions of the data lines 124, and the second side 114b is substantially parallel to the extending directions of the scan lines 122 in the above embodiment, for instance. Hence, the second line segment 134 and the fourth line segment 144 are, for instance, overlapped with an end of the corresponding data lines 124. That is to say, the first and the second repairing lines 130 and 140 are used to repair the data lines 124, for example. However, in another embodiment (not shown) of the invention, given the first side 114a is substantially parallel to the extending directions of the scan lines 122, and the second side 114b is substantially parallel to the extending directions of the data lines 124, for example, the second line segment 134 and the fourth line segment 144 are overlapped with an end of the corresponding scan lines 122, for instance, so as to repair the scan lines 122.

In the display panels 100 and 100a of this embodiment, the opposite substrate 160 at least does not cover the first line segment 132 of the first repairing line 130 and the third line segment 142 of the second repairing line 140, such that the first line segment 132 of the first repairing line 130 and the third line segment 142 of the second repairing line 140 are exposed outside the opposite substrate 160. Hence, the capacitance is not generated between the electrode layer 164 of the opposite substrate 160 and at least the first and the third line segments 132 and 142. Thus, when the first and the second repairing lines 130 and 140 are connected to the signal lines for repairing the signal lines, the signal transmission on the signal lines is not affected by the RC overloading effect on the first and the second repairing lines 130 and 140. Consequently, satisfactory display quality of the display panel can be achieved after repair.

Second Embodiment

Figure 3A:
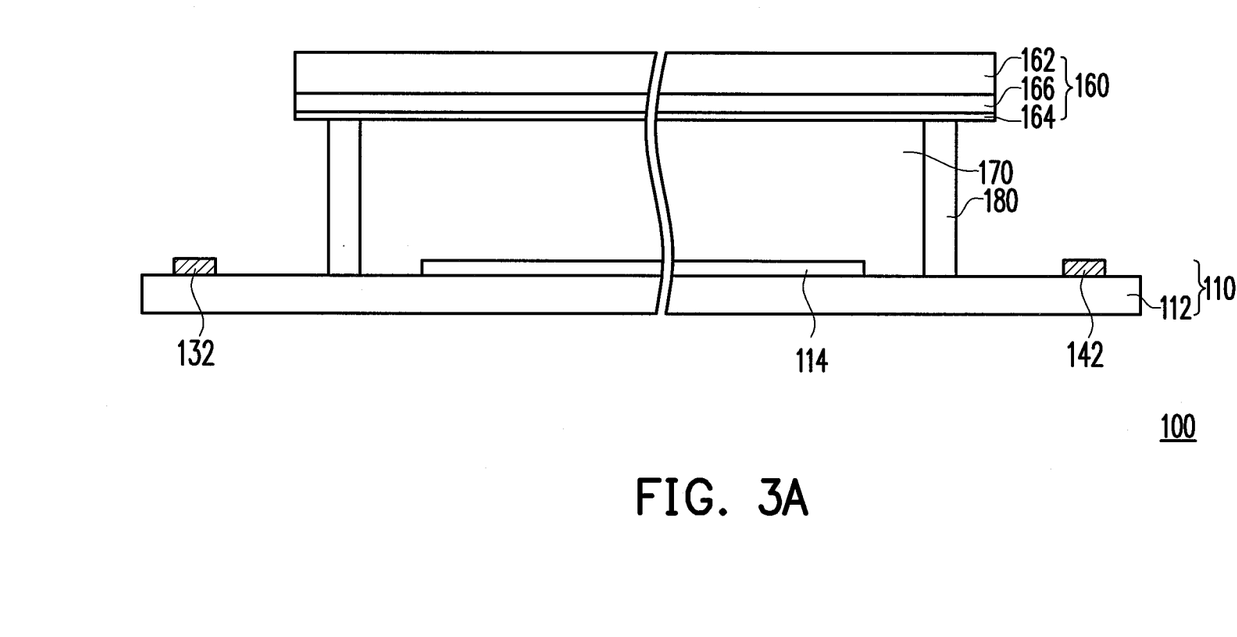
FIG. 3A is a schematic cross-sectional view illustrating a display panel according to a second embodiment of the invention.
Figure 3B:
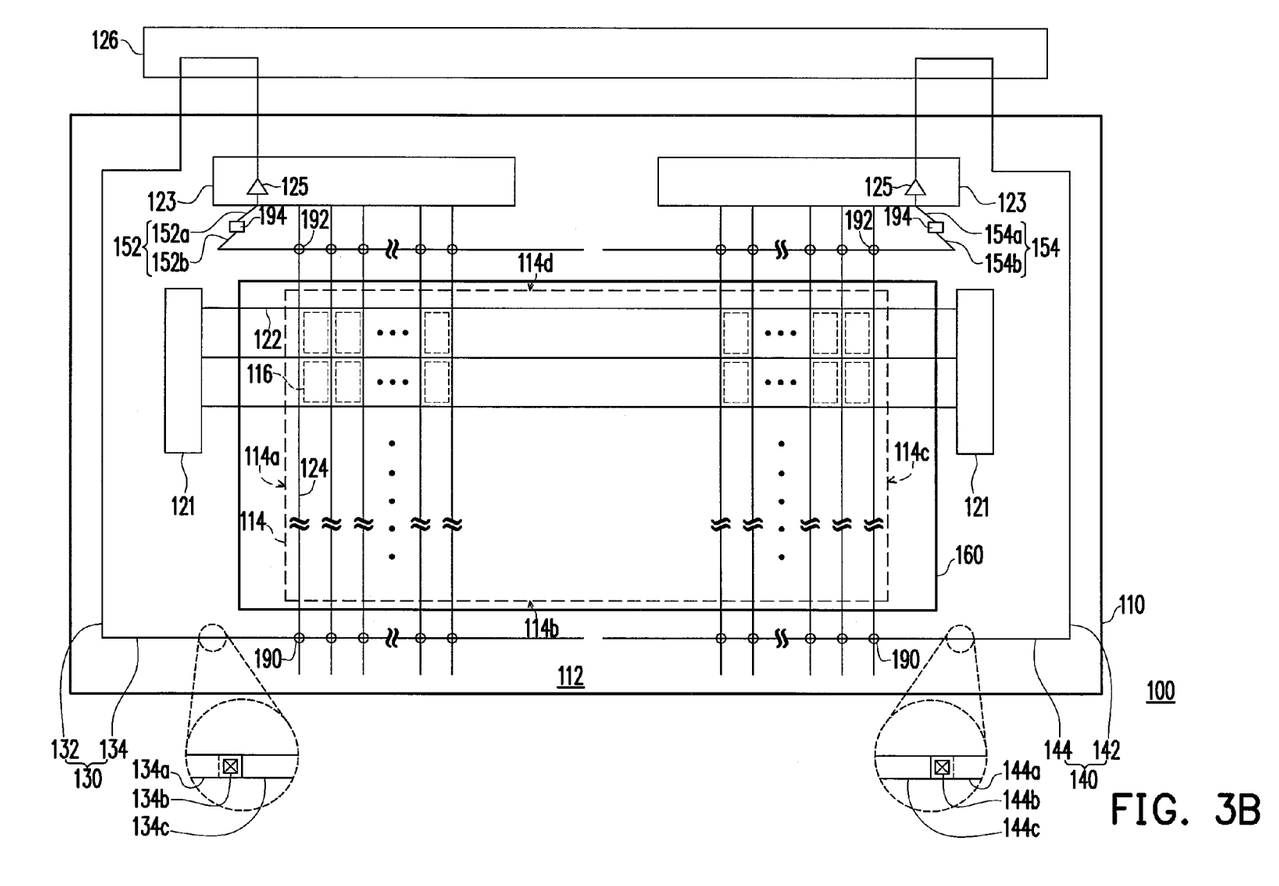
FIG. 3B is a schematic top view illustrating the display panel depicted in FIG. 3A.

FIG. 3A is a schematic cross-sectional view illustrating a display panel according to a second embodiment of the invention. FIG. 3B is a schematic top view illustrating the display panel depicted in FIG. 3A. In FIG. 3B, the liquid crystal layer is not shown. With reference to FIG. 3A and FIG. 3B, in this embodiment, the display panel 100 includes an active device array substrate 110, an opposite substrate 160, and a liquid crystal layer 170. The active device array substrate 110 and the opposite substrate 160 have the same components as those described in the first embodiment, and therefore the detailed description thereof can refer to the abovementioned. The first repairing line 130 and the second repairing line 140 are described below.

The first repairing line 130 is disposed on the first substrate 112 and includes a first line segment 132 and a second line segment 134. The first line segment 132 is located at a first side 114a of the pixel array 114. The second line segment 134 is located at a second side 114b of the pixel array 114 and electrically connected to the first line segment 132. Here, the first side 114a is substantially perpendicular to the second side 114b. In this embodiment, the first side 114a is substantially parallel to extending directions of the data lines 124, and the second side 114b is substantially parallel to extending directions of the scan lines 122, for instance.

According to this embodiment, the second line segment 134 includes a first trace 134a, a plug 134b, and a second trace 134c, for instance. The first trace 134a is electrically connected to the first line segment 132, and the second trace 134c is overlapped with an end of corresponding data lines 124, so as to form a plurality of pre-repair points 190. The first trace 134a and the second trace 134c are electrically connected through the plug 134b. The first line segment 132, the first trace 134a, and the data lines 124 are formed by the second metal layer (Metal 2), and the second trace 134c and the scan lines 122 are formed by the first metal layer (Metal 1), for instance. An insulating layer is disposed between the first metal layer and the second metal layer. The plug 134b is formed in the insulating layer to electrically connect the first trace 134a and the second trace 134c. That is to say, the first trace 134a and the first line segment 132 are substantially formed by patterning the metal layer (e.g., the second metal layer) in the same photolithography and etching process. Hence, the first trace 134a and the first line segment 132 are integrally formed. Besides, the first trace 134a is electrically connected to the second trace 134c through the plug 134b.

The second repairing line 140 is disposed on the first substrate 112 and includes a third line segment 142 and a fourth line segment 144. The third line segment 142 is located at a third side 114c of the pixel array 114, and the third side 114c is substantially parallel to the first side 114a. The fourth line segment 144 is electrically connected to the third line segment 142 and located at the second side 114b of the pixel array 114. According to this embodiment, the fourth line segment 144 includes a third trace 144a, a plug 144b, and a fourth trace 144c, for instance. The third trace 144a is electrically connected to the third line segment 142, and the fourth trace 144c is overlapped with an end of corresponding data lines 124, so as to form a plurality of pre-repair points 190. The third trace 144a and the fourth trace 144c are electrically connected through the plug 144b. The third line segment 142, the third trace 144a, and the data lines 124 are formed by the second metal layer (Metal 2), and the fourth trace 144c and the scan lines 122 are formed by the first metal layer (Metal 1), for instance. The plug 144b is formed in the insulating layer between the first and the second metal layers, so as to electrically connect the third trace 144a and the fourth trace 144c. That is to say, the third trace 144a and the third line segment 142 are substantially formed by patterning the metal layer (e.g., the second metal layer) in the same photolithography and etching process. Hence, the third trace 144a and the third line segment 142 are integrally formed. Besides, the third trace 144a is electrically connected to the fourth trace 144c through the plug 144b.

Figure 4:
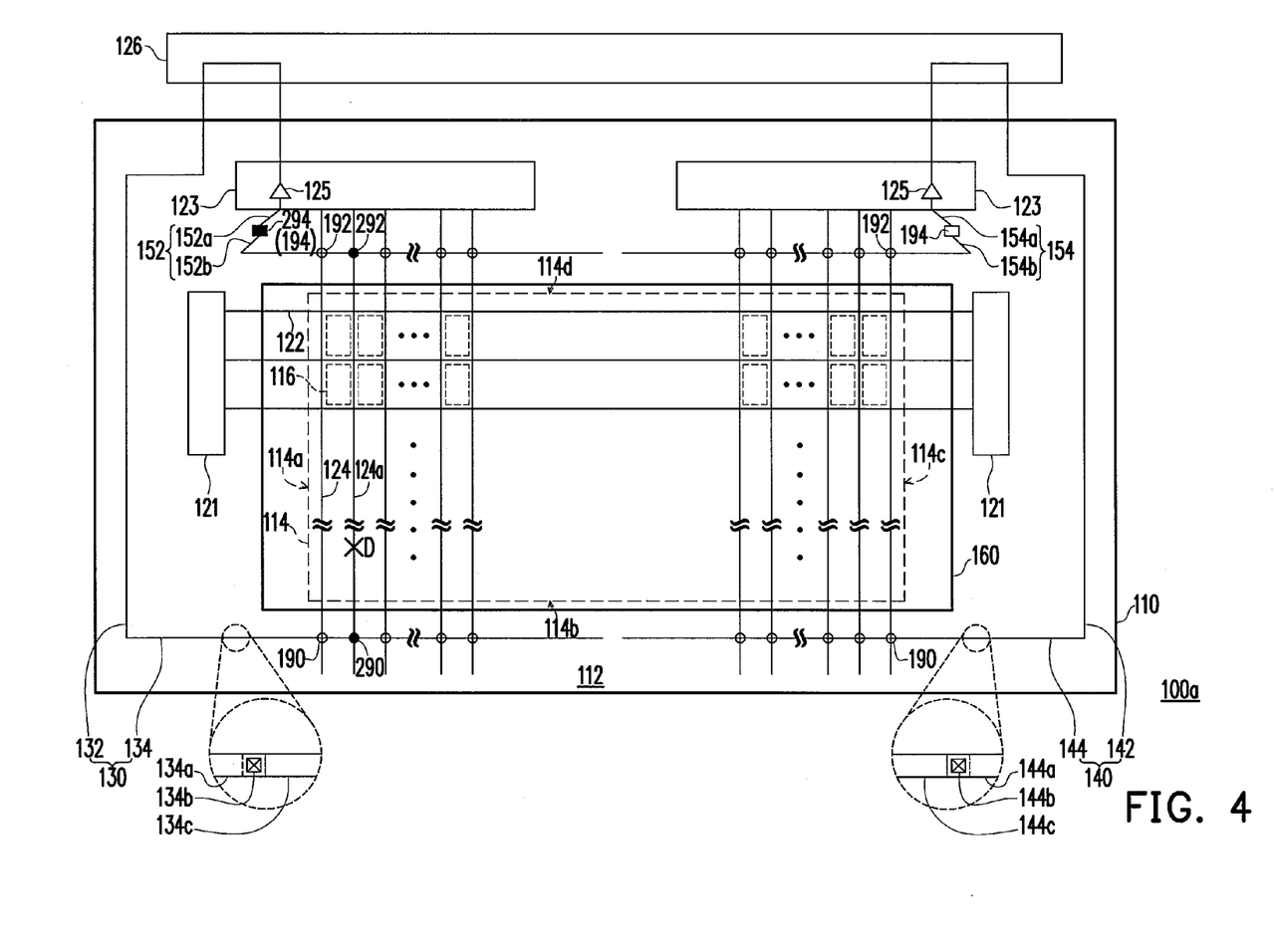
FIG. 4 is a schematic top view illustrating a display panel according to an embodiment of the invention.

One of the data lines 124 in the aforesaid display panel 100 has an open defect and is then repaired, and the structure of the repaired data line 124 is described below. FIG. 4 illustrates a display panel 100a. The display panel 100a is the display panel 100 of FIG. 3B which has the open defect and is repaired. Note that the first repairing line 130 and the third repairing line 152 are used to repair the broken data line 124a that is overlapped with the first and the third repairing lines 130 and 152, as shown in FIG. 4. However, the broken data line 124a overlapped with the second and the fourth repairing lines 140 and 154 is repaired by using the second and the fourth repairing lines 140 and 154 in the same way, and thus no further description is provided hereinafter.

As depicted in FIG. 4, given that one data line 124a of the data lines 124 of the signal lines has an open defect D and is broken, the pre-repair points 192, 194, and 190 corresponding to the broken data line 124a are welded, so as to form welding points 292, 294, and 290. Thereby, a complete data transmission circuit can be formed. More specifically, the data line 124a is electrically connected to the second portion 152b of the third repairing line 152 through the welding point 292 (i.e., the welded pre-repair point 192), and the second portion 152b of the third repairing line 152 is electrically connected to the first portion 152a of the third repairing line 152 through the welding point 294 (i.e., the welded pre-repair point 194). In addition, the first portion 152a of the third repairing line 152 is electrically connected to an end of the first repairing line 130 through the amplifier 125, while the other end of the first repairing line 130 is electrically connected to the data line 124a through the welding point 290 (i.e., the welded pre-repair point 190). As such, signals can be transmitted to the pixels corresponding to the data line 124a, and the pixels can be driven to function in a normal manner.

Note that the opposite substrate 160 does not cover the first line segment 132 and the third line segment 142 in the display panels 100 and 100a of this embodiment, as shown in FIG. 3A to FIG. 4. Hence, the electrode layer 164 is not located right above the first line segment 132 and the third line segment 142. As a result, capacitance is not generated between the first line segment 132 and the electrode layer 164 and between the third line segment 142 and the electrode layer 164. Additionally, in this embodiment, the opposite substrate 160 does not cover the second line segment 134 and the fourth line segment 144, for instance. In other words, the opposite substrate 160 of this embodiment does not cover the first repairing line 130 and the second repairing line 140, such that the first and the second repairing lines 130 and 140 are exposed outside the opposite substrate 160. Moreover, in this embodiment, the opposite substrate 160 does not cover the third repairing line 152 and the fourth repairing line 154, such that the third and the fourth repairing lines 152 and 154 are exposed outside the opposite substrate 160. Accordingly, in this embodiment, all of the repairing lines 130, 140, 152, and 154 are exposed outside the opposite substrate 160, for instance. Thereby, capacitance is not generated between the electrode layer 164 of the opposite substrate 160 and the repairing lines 130, 140, 152, and 154. However, the opposite substrate 160 can also cover the third and the fourth repairing lines 152 and 154 in another embodiment. Alternatively, the opposite substrate 160 can cover the second and the fourth line segments 134 and 144, while the first line segment 132 and the third line segment 142 are exposed. The invention is not limited to what is described above.

The display panel 100 as shown in FIG. 3A and the display panel 100a both include a sealant 180 disposed between the active device array substrate 110 and the opposite substrate 160, for example. Besides, the sealant 180 surrounds the pixel array 114, for instance, which is not shown in FIG. 3B and FIG. 4. In this embodiment, the first line segment 132 and the second line segment 134 of the first repairing line 130 are located at an outer side of the sealant 180, and the third line segment 142 and the fourth line segment 144 of the second repairing line 140 are also located at the outer side of the sealant 180, for instance.

In the display panels 100 and 100a of this embodiment, the opposite substrate 160 at least does not cover the first line segment 132 of the first repairing line 130 and the third line segment 142 of the second repairing line 140, such that the first line segment 132 of the first repairing line 130 and the third line segment 142 of the second repairing line 140 are exposed outside the opposite substrate 160. Hence, the capacitance is not generated between the electrode layer 164 of the opposite substrate 160 and at least the first and the third line segments 132 and 142. When the first and the second repairing lines 130 and 140 are connected to the signal lines for repairing the signal lines, the signal transmission on the signal lines is not affected by the RC overloading effect on the first and the second repairing lines 130 and 140. Consequently, satisfactory display quality of the display panel can be achieved after repair.

Third Embodiment

Figure 5A:
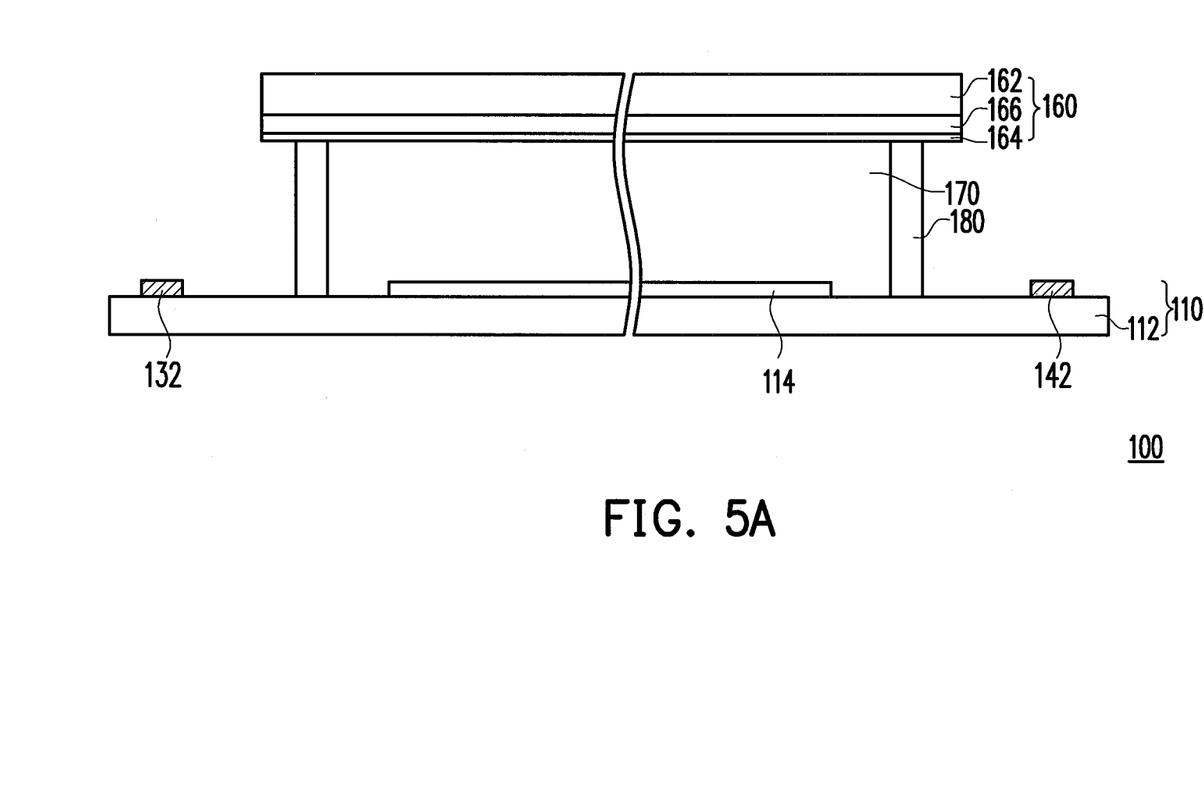
FIG. 5A is a schematic cross-sectional view illustrating a display panel according to a third embodiment of the invention.
Figure 5B:
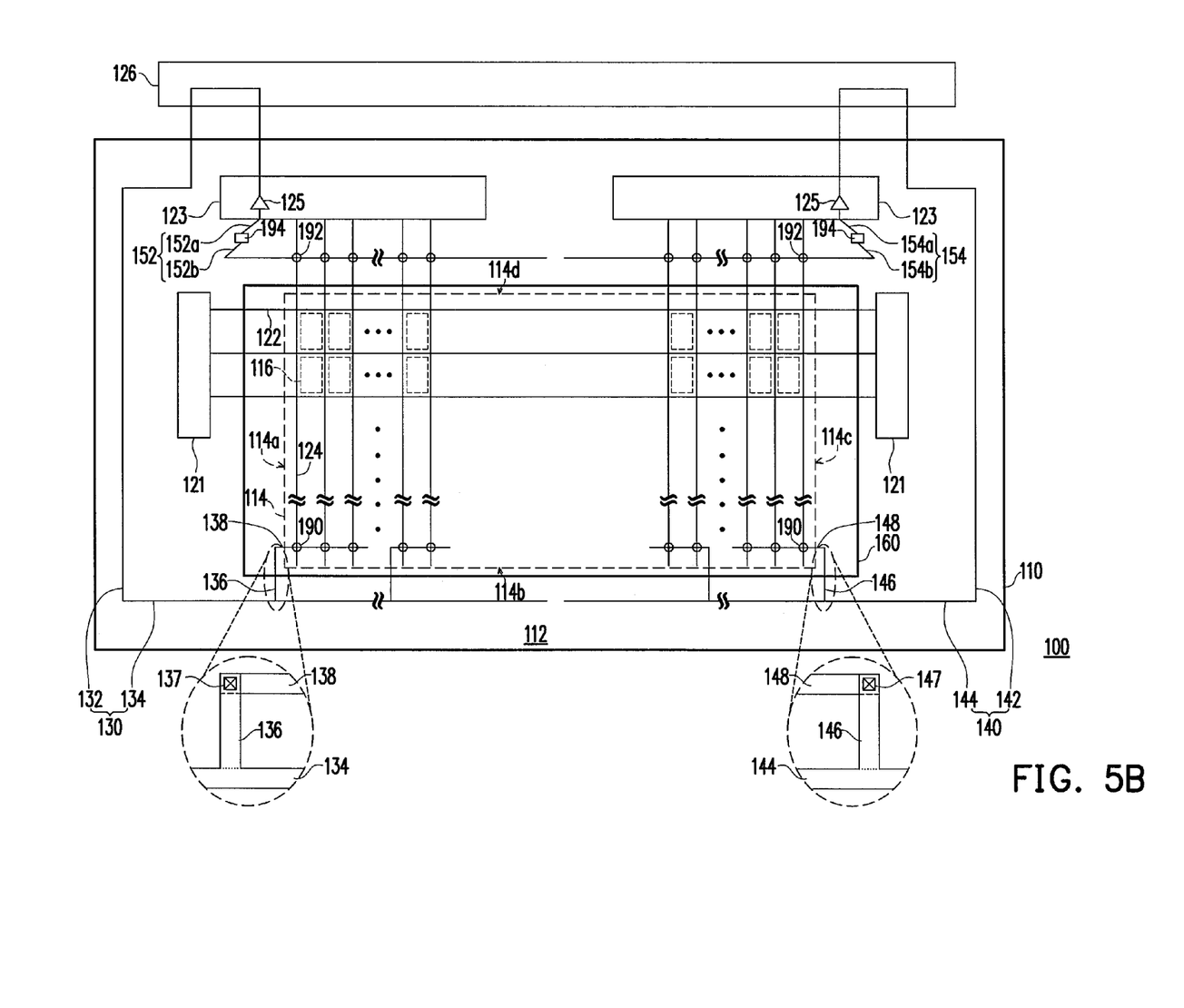
FIG. 5B is a schematic top view illustrating the display panel depicted in FIG. 5A.

FIG. 5A is a schematic cross-sectional view illustrating a display panel according to a third embodiment of the invention. FIG. 5B is a schematic top view illustrating the display panel depicted in FIG. 5A. In FIG. 5B, the liquid crystal layer is not shown. With reference to FIG. 5A and FIG. 5B, in this embodiment, the display panel 100 includes an active device array substrate 110, an opposite substrate 160, and a liquid crystal layer 170. The active device array substrate 110 and the opposite substrate 160 have the same components as those described in the first embodiment, and therefore the detailed description thereof can refer to the abovementioned. The first repairing line 130 and the second repairing line 140 are described below.

The first repairing line 130 is disposed on the first substrate 112 and includes a first line segment 132, a second line segment 134, a plurality of first sub-line segments 136, and a plurality of second sub-line segments 138. The first line segment 132 is located at a first side 114a of the pixel array 114. The second line segment 134 is located at a second side 114b of the pixel array 114 and electrically connected to the first line segment 132. Here, the first side 114a is substantially perpendicular to the second side 114b. In this embodiment, the first side 114a is substantially parallel to extending directions of the data lines 124, and the second side 114b is substantially parallel to extending directions of the scan lines 122, for instance.

According to this embodiment, each of the first sub-line segments 136 is electrically connected to the second line segment 134, and each of the second sub-line segments 138 is overlapped with a corresponding one of the first sub-line segments 136 and is overlapped with an end of the corresponding data lines 124, so as to form the pre-repair points 190. Note that each of the second sub-line segments 138 in this embodiment is overlapped with an end of the corresponding data lines 124, while each of the second sub-line segments 138 in another embodiment can also be overlapped with an end of a corresponding one of the data lines 124.

In this embodiment, extending directions of the first sub-line segments 136 are substantially perpendicular to an extending direction of the second line segment 134, and extending directions of the second sub-line segments 138 are substantially parallel to the extending direction of the second line segment 134, for instance. The first line segment 132, the second line segment 134, the first sub-line segments 136, and the data lines 124 are formed by the second metal layer (Metal 2), and the second sub-line segments 138 are formed by the first metal layer (Metal 1), for instance. An insulating layer is disposed between the first metal layer and the second metal layer. Particularly, in this embodiment, the plug 137 is formed in the insulating layer to electrically connect the first sub-line segments 136 and the second sub-line segments 138. That is to say, the first line segment 132, the second line segment 134, and the first sub-line segments 136 are substantially formed by patterning the metal layer (e.g., the second metal layer) in the same photolithography and etching process. Hence, the first line segment 132, the second line segment 134, and the first sub-line segments 136 are integrally formed. The first sub-line segments 136 and the second sub-line segments 138 are electrically connected through the plug 137. However, in another embodiment (not shown), the second sub-line segments 138 can be overlapped with a corresponding one of the first sub-line segments 136 to form the pre-repair points 190, and the second sub-line segments 138 and a corresponding one of the first sub-line segments 136 are electrically insulated from each other. In other words, before the second sub-line segments 138 and the first sub-line segments 136 are welded through the pre-repair points 190, the second sub-line segments 138 and a corresponding one of the first sub-line segments 136 are not electrically connected.

The second repairing line 140 is disposed on the first substrate 112 and includes a third line segment 142, a fourth line segment 144, a plurality of third sub-line segments 146, and a plurality of fourth sub-line segments 148. The third line segment 142 is located at a third side 114c of the pixel array 114, and the third side 114c is substantially parallel to the first side 114a. The fourth line segment 144 is electrically connected to the third line segment 142 and located at the second side 114b of the pixel array 114. In this embodiment, the third side 114c is substantially parallel to the extending directions of the data lines 124, and the second side 114b is substantially parallel to the extending directions of the scan lines 122, for instance. That is to say, the first line segment 132 and the third line segment 142 are located at opposite sides of the pixel array 114. The second line segment 134 and the fourth line segment 144 are located at the same side of the pixel array 114 and electrically insulated from each other.

According to this embodiment, each of the third sub-line segments 146 is electrically connected to the fourth line segment 144, and each of the fourth sub-line segments 148 is overlapped with a corresponding one of the third sub-line segments 146 and is overlapped with an end of the corresponding data lines 124, so as to form the pre-repair points 190. Note that each of the fourth sub-line segments 148 in this embodiment is overlapped with an end of the corresponding data lines 124, while each of the fourth sub-line segments 148 in another embodiment can also be overlapped with an end of a corresponding one of the data lines 124. In this embodiment, extending directions of the third sub-line segments 146 are substantially perpendicular to an extending direction of the fourth line segment 144, and extending directions of the fourth sub-line segments 148 are substantially parallel to the extending direction of the fourth line segment 144, for instance. The third line segment 142, the fourth line segment 144, the third sub-line segments 146, and the data lines 124 are formed by the second metal layer (Metal 2), and the fourth sub-line segments 148 are formed by the first metal layer (Metal 1), for instance. An insulating layer is disposed between the first metal layer and the second metal layer. Particularly, in this embodiment, the plug 147 is formed in the insulating layer to electrically connect the third sub-line segments 146 and the fourth sub-line segments 148. That is to say, the third line segment 142, the fourth line segment 144, and the third sub-line segments 146 are substantially formed by patterning the metal layer (e.g., the second metal layer) in the same photolithography and etching process. Hence, the third line segment 142, the fourth line segment 144, and the third sub-line segments 146 are integrally formed. The third sub-line segments 146 and the fourth sub-line segments 148 are electrically connected through the plug 147. However, in another embodiment (not shown), the fourth sub-line segments 148 can be overlapped with a corresponding one of the third sub-line segments 146 to form the pre-repair points 190, and the fourth sub-line segments 148 and a corresponding one of the third sub-line segments 146 are electrically insulated from each other. In other words, before the fourth sub-line segments 148 and the third sub-line segments 146 are welded through the pre-repair points 190, the fourth sub-line segments 148 and a corresponding one of the third sub-line segments 146 are not electrically connected.

Figure 6:
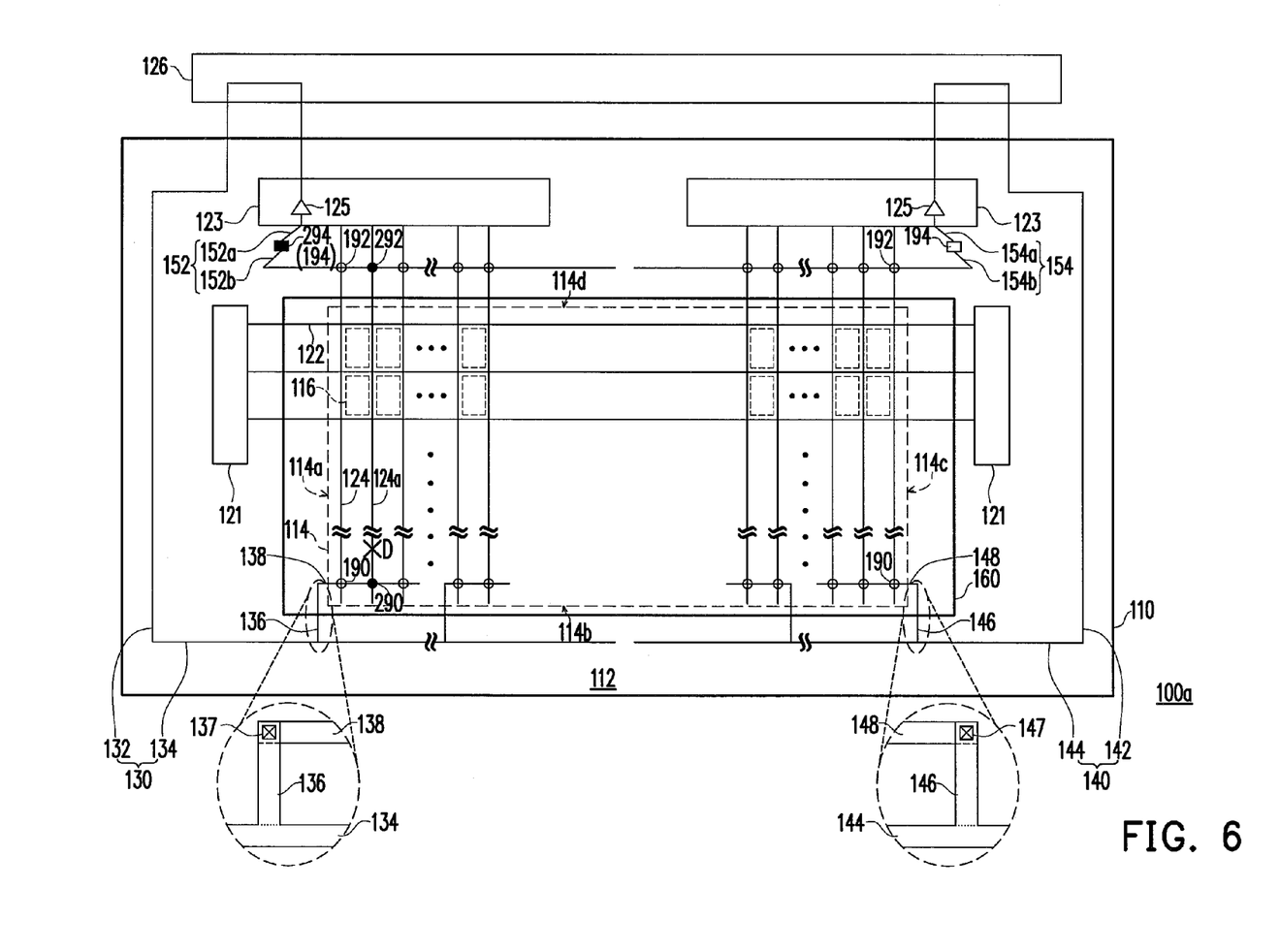
FIG. 6 is a schematic top view illustrating a display panel according to an embodiment of the invention.

One of the data lines 124 in the aforesaid display panel 100 has an open defect and is then repaired, and the structure of the repaired data line 124 is described below. FIG. 6 illustrates a display panel 100a. The display panel 100a is the display panel 100 of FIG. 5B which has the open defect and is repaired. Note that the first repairing line 130 and the third repairing line 152 are used to repair the broken data line 124a that is overlapped with the first and the third repairing lines 130 and 152, as shown in FIG. 6. However, the broken data line 124a overlapped with the second and the fourth repairing lines 140 and 154 is repaired by using the second and the fourth repairing lines 140 and 154 in the same way, and thus no further description is provided hereinafter.

As depicted in FIG. 6, given that one data line 124a of the data lines 124 of the signal lines has an open defect D and is broken, the pre-repair points 192, 194, and 190 corresponding to the broken data line 124a are welded, so as to form welding points 292, 294, and 290. Thereby, a complete data transmission circuit can be formed. More specifically, the data line 124a is electrically connected to the second portion 152b of the third repairing line 152 through the welding point 292 (i.e., the welded pre-repair point 192), and the second portion 152b of the third repairing line 152 is electrically connected to the first portion 152a of the third repairing line 152 through the welding point 294 (i.e., the welded pre-repair point 194). In addition, the first portion 152a of the third repairing line 152 is electrically connected to an end of the first repairing line 130 through the amplifier 125, while the other end of the first repairing line 130 is electrically connected to the data line 124a through the welding point 290 (i.e., the welded pre-repair point 190). As such, signals can be transmitted to the pixels corresponding to the data line 124a, and the pixels can be driven to function in a normal manner. It is noted that the first sub-line segments 136 and the second sub-line segments 138 are electrically connected through the plug 137 in this embodiment, but the invention is not limited thereto. In another embodiment (not shown), the first sub-line segments 136 and the second sub-line segments 138 are electrically connected through the welding point 290 (i.e., the welded pre-repair point 190), and thus the other end of the first repairing line 130 is electrically connected to the data line 124a through the welding point 290 formed between the first sub-line segments 136 and the second sub-line segments 138 and the welding point 290 formed between the second sub-line segments 138 and the data line 124a.

Note that the opposite substrate 160 does not cover the first line segment 132 and the third line segment 142 in the display panels 100 and 100a of this embodiment, as shown in FIG. 5A to FIG. 6. Hence, the electrode layer 164 is not located right above the first line segment 132 and the third line segment 142. As a result, capacitance is not generated between the first line segment 132 and the electrode layer 164 and between the third line segment 142 and the electrode layer 164. Additionally, in this embodiment, the opposite substrate 160 does not cover the second line segment 134 and the fourth line segment 144, for instance. Moreover, the opposite substrate 160 of this embodiment does not cover the third repairing line 152 and the fourth repairing line 154, such that the third and the fourth repairing lines 152 and 154 are exposed outside the opposite substrate 160. In other words, the opposite substrate 160 of this embodiment merely covers the sub-line segments 136 and 138 of the first repairing line 130 and the sub-line segments 146 and 148 of the second repairing line 140, such that other portions, except for the sub-line segments 136, 138, 146, and 148, are exposed outside the opposite substrate 160. Thereby, capacitance generated between the electrode layer 164 and the sub-line segments 136, 138, 146, and 148 can be significantly reduced. Certainly, the opposite substrate 160 can also cover the third and the fourth repairing lines 152 and 154 in another embodiment. Alternatively, the opposite substrate 160 can cover the second and the fourth line segments 134 and 144, while the first line segment 132 and the third line segment 142 are exposed. The invention is not limited to what is described above.

The display panel 100 indicated in FIG. 5A and the display panel 100a both include a sealant 180 disposed between the active device array substrate 110 and the opposite substrate 160, for example. Besides, the sealant 180 surrounds the pixel array 114, for instance, which is not shown in FIG. 5B and FIG. 6. In this embodiment, the first line segment 132 and the second line segment 134 of the first repairing line 130 are located at an outer side of the sealant 180, and the third line segment 142 and the fourth line segment 144 of the second repairing line 140 are also located at the outer side of the sealant 180, for instance.

In the display panels 100 and 100a of this embodiment, the opposite substrate 160 at least does not cover the first line segment 132 of the first repairing line 130 and the third line segment 142 of the second repairing line 140, such that the first line segment 132 of the first repairing line 130 and the third line segment 142 of the second repairing line 140 are exposed outside the opposite substrate 160. Hence, the capacitance is not generated between the electrode layer 164 of the opposite substrate 160 and at least the first and the third line segments 132 and 142. Thus, when the first and the second repairing lines 130 and 140 are connected to the signal lines for repairing the signal lines, the signal transmission on the signal lines is not affected by the RC overloading effect on the first and the second repairing lines 130 and 140. Consequently, satisfactory display quality of the display panel can be achieved after repair.

It should be mentioned that the first side 114a is substantially parallel to the extending directions of the data lines 124, and the second side 114b is substantially parallel to the extending directions of the scan lines 122 in the above embodiment, for instance. Hence, the second sub-line segments 138 and the fourth sub-line segments 148 are overlapped with an end of the corresponding data lines 124, for instance. That is to say, the first and the second repairing lines 130 and 140 are used to repair the data lines 124, for example. However, in another embodiment (not shown) of the invention, when the first side 114a is substantially parallel to the extending directions of the scan lines 122, and the second side 114b is substantially parallel to the extending directions of the data lines 124, for example, the second sub-line segments 138 and the fourth sub-line segments 148 are overlapped with an end of the corresponding scan lines 122, for instance, so as to repair the scan lines 122. Furthermore, in the previous embodiments, structures of the first repairing line 130 and the second repairing line 140 are exemplarily shown in FIG. 1B, FIG. 2, FIG. 3B, FIG. 4, FIG. 5B, and FIG. 6, which is not limited in this invention. Namely, the repairing lines of this invention can have other structures.

In light of the foregoing, the opposite substrate of the display panel at least does not cover parts of the repairing lines according to this invention, and at least parts of the repairing lines are exposed outside the opposite substrate. Therefore, at least parts of the repairing lines and the electrode layer of the opposite substrate do not generate the capacitance. As such, when the repairing lines are connected to the signal lines for repairing the signal lines, the RC overloading effect on the repairing lines does not occur, and thus the signal transmission on the signal lines is not affected. Consequently, satisfactory display quality of the display panel can be achieved after repair.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:
1. A display panel comprising:
an active device array substrate comprising:
a first substrate;
a pixel array disposed on the first substrate;
a plurality of signal lines disposed on the first substrate and electrically connected to the pixel array;
a first repairing line disposed on the first substrate and comprising:
a first line segment located at a first side of the pixel array; and
a second line segment located at a second side of the pixel array and electrically connected to the first line segment, wherein the first side is substantially perpendicular to the second side; and
a second repairing line disposed on the first substrate and comprising:
a third line segment located at a third side of the pixel array, wherein the third side is substantially parallel to the first side; and
a fourth line segment located at the second side of the pixel array and electrically connected to the third line segment;
an opposite substrate located above the active device array substrate and not covering the first line segment and the third line segment, the opposite substrate comprising:
a second substrate disposed opposite to the first substrate; and
an electrode layer disposed on the second substrate; and
a liquid crystal layer disposed between the active device array substrate and the opposite substrate.

2. The display panel as claimed in claim 1, further comprising a sealant disposed between the active device array substrate and the opposite substrate, wherein the first line segment and the third line segment are located at an outer side of the sealant.

3. The display panel as claimed in claim 1, wherein the opposite substrate does not cover the second line segment and the fourth line segment.

4. The display panel as claimed in claim 1, wherein the second line segment and the fourth line segment are overlapped with an end of the signal lines corresponding thereto.

5. The display panel as claimed in claim 1, wherein the second line segment comprises a first trace, a first plug, and a second trace, the first trace is electrically connected to the first line segment, the second trace is overlapped with an end of the signal lines corresponding thereto, and the first trace and the second trace are electrically connected through the first plug.

6. The display panel as claimed in claim 5, wherein the fourth line segment comprises a third trace, a second plug, and a fourth trace, the third trace is electrically connected to the third line segment, the fourth trace is overlapped with an end of the signal lines corresponding thereto, and the third trace and the fourth trace are electrically connected through the second plug.

7. The display panel as claimed in claim 1, wherein the first repairing line further comprises a plurality of first sub-line segments and a plurality of second sub-line segments, each of the first sub-line segments is electrically connected to the second line segment, and each of the second sub-line segments is overlapped with a corresponding one of the first sub-line segments and an end of the signal lines corresponding thereto.

8. The display panel as claimed in claim 7, wherein extending directions of the first sub-line segments are substantially perpendicular to an extending direction of the second line segment, and extending directions of the second sub-line segments are substantially parallel to the extending direction of the second line segment.

9. The display panel as claimed in claim 7, wherein the second repairing line further comprises a plurality of third sub-line segments and a plurality of fourth sub-line segments, each of the third sub-line segments is electrically connected to the fourth line segment, and each of the fourth sub-line segments is overlapped with a corresponding one of the third sub-line segments and an end of the signal lines corresponding thereto.

10. The display panel as claimed in claim 9, wherein extending directions of the third sub-line segments are substantially perpendicular to an extending direction of the fourth line segment, and extending directions of the fourth sub-line segments are substantially parallel to the extending direction of the fourth line segment.

11. A display panel comprising:
an active device array substrate comprising:
a first substrate;
a pixel array disposed on the first substrate;

a plurality of signal lines disposed on the first substrate and electrically connected to the pixel array, one of the signal lines having an open defect;
a first repairing line disposed on the first substrate and comprising:
a first line segment located at a first side of the pixel array; and
a second line segment located at a second side of the pixel array, the first side being substantially perpendicular to the second side, wherein the second line segment is electrically connected to the first line segment and overlapped with an end of the signal lines corresponding thereto; and
a second repairing line disposed on the first substrate and comprising:
a third line segment located at a third side of the pixel array, wherein the third side is substantially parallel to the first side; and
a fourth line segment located at the second side of the pixel array, the fourth line segment being electrically connected to the third line segment and overlapped with an end of the signal lines corresponding thereto, wherein an overlapping area of the second line segment and the signal line having the open defect has at least one welding point;
an opposite substrate located above the active device array substrate and not covering the first line segment and the third line segment, the opposite substrate comprising:
a second substrate disposed opposite to the first substrate; and
an electrode layer disposed on the second substrate; and
a liquid crystal layer disposed between the active device array substrate and the opposite substrate.

12. The display panel as claimed in claim 11, further comprising a sealant disposed between the active device array substrate and the opposite substrate, wherein the first line segment and the third line segment are located at an outer side of the sealant.

13. The display panel as claimed in claim 11, wherein the opposite substrate does not cover the second line segment and the fourth line segment.

14. The display panel as claimed in claim 11, wherein the second line segment comprises a first trace, a plug, and a second trace, the first trace is electrically connected to the first line segment, the second trace is overlapped with an end of the signal lines corresponding thereto, the first trace and the second trace are electrically connected through the plug, and the overlapping area of the second trace and the signal line having the open defect has at least one welding point.

15. A display panel comprising:
an active device array substrate comprising:
a first substrate;
a pixel array disposed on the first substrate;
a plurality of signal lines disposed on the first substrate and electrically connected to the pixel array, one of the signal lines having an open defect;
a first repairing line disposed on the first substrate and comprising:
a first line segment located at a first side of the pixel array;
a second line segment located at a second side of the pixel array and electrically connected to the first line segment, wherein the first side is substantially perpendicular to the second side;
a plurality of first sub-line segments and a plurality of second sub-line segments, each of the first sub-line segments being electrically connected to the second line segment, each of the second sub-line segments being overlapped with a corresponding one of the first sub-line segments and an end of the signal lines corresponding thereto, wherein an overlapping area of one of the second sub-line segments and the signal line having the open defect has a welding point, and an overlapping area of the one of the second sub-line segments and a corresponding one of the first sub-line segments has a welding point;
a second repairing line disposed on the first substrate and comprising:
a third line segment located at a third side of the pixel array, wherein the third side is substantially parallel to the first side;
a fourth line segment located at the second side of the pixel array and electrically connected to the third line segment;
an opposite substrate located above the active device array substrate and not covering the first line segment and the third line segment, the opposite substrate comprising:
a second substrate disposed opposite to the first substrate; and
an electrode layer disposed on the second substrate; and
a liquid crystal layer disposed between the active device array substrate and the opposite substrate.

16. The display panel as claimed in claim 15, further comprising a sealant disposed between the active device array substrate and the opposite substrate, wherein the first line segment and the third line segment are located at an outer side of the sealant.

17. The display panel as claimed in claim 15, wherein the opposite substrate does not cover the second line segment and the fourth line segment.

18. The display panel as claimed in claim 15, wherein extending directions of the first sub-line segments are substantially perpendicular to an extending direction of the second line segment, and extending directions of the second sub-line segments are substantially parallel to the extending direction of the second line segment.

19. The display panel as claimed in claim 15, wherein the second repairing line further comprises a plurality of third sub-line segments and a plurality of fourth sub-line segments, each of the third sub-line segments is electrically connected to the fourth line segment, and each of the fourth sub-line segments is overlapped with a corresponding one of the third sub-line segments and an end of the signal lines corresponding thereto.

20. The display panel as claimed in claim 19, wherein extending directions of the third sub-line segments are substantially perpendicular to an extending direction of the fourth line segment, and extending directions of the fourth sub-line segments are substantially parallel to the extending direction of the fourth line segment.

* * * * *